United States Patent

Ogura et al.

[11] Patent Number: 5,739,888
[45] Date of Patent: Apr. 14, 1998

[54] LIQUID CRYSTAL DISPLAY ELEMENT

[75] Inventors: Masami Ogura, Kashihara; Hiroshi Takanashi, Soraku-gun; Tohru Okuda; Kenji Yasutake, both of Nara, all of Japan

[73] Assignee: Sharp Kabushiki Kaisha, Osaka, Japan

[21] Appl. No.: 685,469

[22] Filed: Jul. 24, 1996

[30] Foreign Application Priority Data

Sep. 14, 1995 [JP] Japan ............................ 7-237463

[51] Int. Cl.$^6$ ..................... G02F 1/1333; G02F 1/1339
[52] U.S. Cl. ................. 349/153; 349/155; 349/110
[58] Field of Search .......................... 349/153, 155, 349/110

[56] References Cited

U.S. PATENT DOCUMENTS

| 4,222,635 | 9/1980 | Julke | 349/190 |
| 4,740,060 | 4/1988 | Komura et al. | 349/155 |
| 5,105,209 | 4/1992 | Tomii et al. | 349/154 |
| 5,223,964 | 6/1993 | Nagano et al. | 349/155 |

FOREIGN PATENT DOCUMENTS

| 293633 | 12/1991 | Japan . |
| 110063 | 4/1994 | Japan . |

Primary Examiner—William L. Sikes
Assistant Examiner—Julie Ngo
Attorney, Agent, or Firm—David G. Conlin; William J. Daley, Jr.

[57] ABSTRACT

A glass substrate having the first through fourth thin films formed thereon and a glass substrate having the fifth through seventh thin films formed thereon are bonded to each other with the thin-film forming surfaces facing each other through a seal member that is located at the surrounding portion of the substrates. Seal-portion spacers, which are to be mixed in the seal member, are made of glass beads with a spherical particle shape, and the rate thereof to the seal material is set to 7 to 20 Wt %. Further, the particle diameter of the spherical-shaped spacers is represented by (the layer thickness A of a liquid crystal layer)+(the total thickness B+B' of various thin films located within the effective display area)−(the total thickness C+C' of various thin films located in a seal portion)+(0.1 to 0.2 μm). It becomes possible to eliminate irregularities in luminance in the vicinity of the effective display area, and consequently to provide a liquid crystal display element that meets the recent demands for high display quality of STN color liquid crystal display elements.

8 Claims, 19 Drawing Sheets

SEAL PORTION | EFFECTIVE DISPLAY AREA
BLACK MASK PORTION

SEAL PORTION | EFFECTIVE DISPLAY AREA
BLACK MASK PORTION

DISTANCE FROM EDGE OF EFFECTIVE DISPLAY AREA (mm)

SEAL PORTION | EFFECTIVE DISPLAY AREA
BLACK MASK PORTION

SEAL PORTION | EFFECTIVE DISPLAY AREA
BLACK MASK PORTION

LIQUID CRYSTAL DISPLAY ELEMENT

FIELD OF THE INVENTION

The present invention relates to a liquid crystal display element, such as a STN (Super-Twisted-Nematic) type liquid crystal display element and a ferro-dielectric-type liquid crystal display element, wherein precision is particularly required for controlling a gap between the substrates.

BACKGROUND OF THE INVENTION

FIG. 27 shows one example of a conventional STN-type color liquid crystal display element. In this element, a pair of glass substrates 41 and 42 are placed face to face with each other. On the substrate-facing surface of one of the glass substrates 41, a color filter layer 43, an overcoat layer 44, a display-use electrode 45a and an alignment film 46a are formed in this order, and on the substrate-facing surface of the other glass substrate 42, a display-use electrode 45b, an insulating film 47 and an alignment film 46b are formed in this order. These glass substrates 41 and 42 are bonded to each other through a seal material 48 that is located at the surrounding portion of the substrates, and the liquid crystal is sealed in a gap between the glass substrates 41 and 42 that is surrounded by the seal material 48 so as to form a liquid crystal layer 51.

In order to control the gap between the glass substrates 41 and 42, liquid-crystal-layer spacers 50 and seal-portion spacers 49 are respectively provided in the gap between the glass substrates 41 and 42, and in the seal material 48. With respect to these spacers, the liquid-crystal-layer spacers 50 are plastic spacers that are easily subjected to elastic deformation so as to follow the thermal expansion and contraction of the liquid crystal, and the other seal-portion spacers 49 are constituted of glass spacers that are not subjected to elastic deformation in order to fix the glass substrates 41 and 42. Here, the seal portion represents a portion that is bonded through the seal material 48.

The glass spacers for use as the seal-portion spacers 49 are made of glass-fiber powder whose particle has a bar shape, glass beads whose particle has a spherical shape, or other materials, and these materials are mixed in, for example, a seal material of an epoxy that forms the seal material 48, and the seal material 48 is placed at the surrounding portion of the substrates through a screen printing process.

As for the prior art related to the mixing rate of glass-fiber powder or glass beads forming the seal-portion spacers 49 with respect to the seal material 48, (1) Japanese Laid-Open Patent Publication No. 110063/1994 (Tokukaihei 6-110063) has disclosed a method wherein a mixing rate ranging from 0.3 to 5.0 Wt % is disclosed. This is based on the facts that when the ratio of the seal-portion spacer 49 is not more than 0.3 Wt %, the seal-portion spacer 49 tends to damage due to the depressing pressure upon bonding the glass substrates 41 and 42 with the result that a predetermined gap cannot be maintained, and that when it is not less than 5.0 Wt %, the seal material 48 cannot be controlled to a predetermined thickness since the seal-portion spaces 49 overlap each other and become too thick within the seal material 48. In the prior art (1), since glass fiber is used as the seal-portion spacer 49 in the embodiment, the overlapping phenomenon of the seal-portion spacers 49 occurs when the mixing rate is not less than 5.0 Wt %, and even in the case of glass beads that have a spherical particle shape and that are free from such an overlapping phenomenon, the same mixing rate is applied.

However, in the case when the mixing rate is set to the range of 0.3 to 5.0 Wt %, a comparatively high applied pressure is imposed on each of the seal-portion spacers 49 upon bonding the glass substrates 41 and 42, thereby resulting in embedment of the seal-portion spacers 49 into the overcoat layer 44 (protective layer). Therefore, in addition to setting the mixing rate to the range of 0.3 to 5.0 Wt %, the prior art (1) also discloses that, in order to take the embedment into consideration, the particle diameter of each seal-portion spacer 49 is set to be greater than a predetermined gap of the peripheral portion of the substrates by 0.3 to 3.0 μm so that the gap between the glass substrates 41 and 42 in the display section (corresponding to an effective display area) on the substrate-peripheral side, as well as on the substrate-inner surrounding side, is uniformly controlled.

As illustrated in FIG. 30, (2) Japanese Laid-Open Patent Publication No. 293633/1991 (Tokukaihei 3-293633) has disclosed a method wherein the diameter of the seal-section spacer 49 is adjusted in accordance with a step difference within a cell, and set to be greater than the thickness of the liquid crystal layer 51 by the corresponding step difference so that the variation of the thickness in the liquid crystal layer 51 can be reduced in the vicinity of a seal section wherein the seal material 48 is placed.

Here, in recent years, high display quality is demanded for STN color liquid crystal display elements, and in particular, the problem of irregularities in luminance in the vicinity of the effective display area, which is referred to as "washed out", need to be properly solved. Despite such a demand, the arrangements of the above-mentioned prior art (1) and (2) suffer from the irregularities in luminance in the vicinity of the effective display area, failing to properly satisfy the recent demand for high display quality in STN color liquid crystal displays.

In other words, in the arrangement of the prior art (1), the mixing rate of the seal-portion spacers 49 to the seal material 48 is set to the range of 0.3 to 5.0 Wt % and, in order to take into consideration the embedment of the seal-portion spacers 49 into the overcoat layer 44, the particle diameter of each seal-portion spacer 49 is set to be greater than a predetermined gap of the peripheral portion of the substrates by 0.3 to 3.0 μm. However, whatever consideration may be taken into the amount of embedment of the seal-portion spacer 49, it is still very difficult to control the amount of embedment of the seal-portion portion spacer 49 accurately as well as uniformly. Consequently, in the case when an STN color liquid crystal display element is manufactured by using this prior art, irregularities in luminance occur in the peripheral section of the effective display area due to dispersions in the amount of embedment, as illustrated in FIG. 28. More specifically, the dispersions in the amount of embedment makes non-uniform the cell thickness in the vicinity of the peripheral section of the effective display area, and when an electric field is applied to the liquid crystal, partial timing differences occur in rises in the liquid crystal, causing the subsequent irregularities in luminance.

Moreover, in the case of the mixing rate of the seal-portion spacer 49 of 0.3 to 5.0 Wt %, since the rigidity of the seal portion (the value of rigidity obtained when the seal material, such as an epoxy, and the glass spacers are taken as a mixed body) is so weak that, upon application of the pressure to bond the glass substrates 41 and 42, a part of the liquid crystal display element from the seal portion to the vicinity of the effective display area is brought into a state as illustrated in FIG. 29, resulting in a thin cell thickness in the peripheral portion of the effective display area (corresponding to a black mask in the drawing).

Consequently, since the rising characteristic of the liquid crystal with respect to the applied voltage is determined by dΔn (d: cell thickness, Δn: double refractive index), and since the thinner the sell thickness, the faster the rising, irregularities in luminance occur in the vicinity of the effective display area (corresponding to a black mask in the drawing) due to the differences in rises in the liquid crystal, in the case of the arrangement as illustrated in FIG. 29.

In the arrangement of the prior art (2), on the other hand, the thickness, formed by adding a thickness corresponding to the step difference to the thickness of the liquid crystal layer 51 within the effective display area, is used as the particle diameter of the seal-portion spacer 49 so as to make uniform the variation in the thickness of the liquid crystal layer 51 in the peripheral portion of the effective display area. However, in recent years, in order to achieve compactness and thinness of the liquid crystal module size, a back light 53 is placed in the proximity of the edge of a liquid crystal display element 52, as illustrated in FIG. 31; therefore, an STN color liquid display element, when manufactured by the technique of the prior art, causes irregularities in luminance in the effective display area on the back light side due to the back light 53, as shown in FIG. 32. In other words, there are irregularities in luminance due to light leakage as well as those caused by variations in retardation of the liquid crystal layer 51 due to heat generation of the back light.

SUMMARY OF THE INVENTION

The objective of the present invention is to provide a liquid crystal display element which is free from irregularities in luminance in its effective display area and has consequently uniform display quality.

In order to achieve the above-mention objective, the first liquid crystal display element of the present invention is provided with a pair of substrates that have respective opposing surfaces on which thin-films are formed and that are bonded to each other through a seal material that is located at the surrounding portion of the substrates. Liquid crystal is sealed in a gap between the glass substrates that is surrounded by the seal material, and spacers, used for maintaining a predetermined gap between the substrates, are mixed in the seal material. This liquid crystal display element is characterized in that the spacers are spherical spacers made of glass and that the rate of the spacers to the seal material is set to 7 to 20 Wt %. Here, in the present invention, the rate of spacers to the seal material XWt % is designated as:

*X*=(weight of spacers (*g*)/weight of a seal material (*g*))×100 . . . (*Wt* %).

The inventors of the present application have first taken it into consideration that although spacers having rod-shaped particles such as glass fiber have overlaps when the mixing rate of the spacers exceeds 5.0 Wt % (5.26 Wt % based on the above-mentioned definition of the present invention), spherical-shaped spacers such as glass beads do not have overlaps even if the above-mentioned mixing rate is exceeded. Further, the inventors have discovered the following facts: In the case of such granular spacers made of glass, when the rate of spacers to the seal material is set to not less than 7 Wt %, and more preferably to not less than 10 Wt %, the applied pressure that is to be imposed on each spacer in the seal material during a substrate-bonding process is alleviated so that: the embedment of the spacers into the thin film is suppressed, the rigidity of the seal portion is increased, and the amount of displacement of the cell thickness in the vicinity of the effective display area is also suppressed to such a degree that the display quality is not impaired due to irregularities in luminance. Moreover, when the rate exceeds 20 Wt %, it becomes difficult to mix the spacers with the seal material, and problems such as "faded portions" tend to occur when the seal material is printed.

Based on these facts thus discovered, in the present invention spherical-shaped spacers made of glass are used as the spacers and the rate of the spacers to the seal material is set to 7 to 20 Wt %. As a result, it becomes possible to suppress the embedment of the spacers into the thin film where achieving a desired thickness control without causing any overlaps of the spacers. Therefore, this arrangement makes it possible to suppress irregularities in luminance in the vicinity of the effective display area that are caused by partial timing differences occurring in rises in the liquid crystal upon application of a voltage to the liquid crystal, which are caused by dispersions of the cell thickness in the peripheral portion of the effective display area due to dispersions of the amount of embedment. Further, it becomes possible to increase the rigidity of the seal portion. This makes it possible to suppress irregularities in luminance in the vicinity of the effective display area due to timing differences in rises in the liquid crystal that are caused by thinness of the cell thickness in the vicinity of the display area due to the applied pressure during the substrate-bonding process.

Consequently, a liquid crystal display element having uniform display quality, which the prior art fails to achieve, can be achieved.

The second liquid crystal display element of the present invention, which has the same arrangement as the first liquid crystal display element, is characterized in that the particle diameter of the spherical-shaped spacers is represented by (the thickness of a liquid crystal layer)+(the total thickness of various thin films located within the effective display area)−(the total thickness of various thin films located in a seal portion at which the seal material is placed)+(0.1 to 0.2 μm).

In this arrangement, since the particle diameter of the spherical-shaped spacers is set to be greater by 0.1 to 0.2 μm than (the thickness of a liquid crystal layer)+(the total thickness of various thin films located within the effective display area)−(the total thickness of various thin films located in a seal portion at which the seal material is placed), the cell thickness in the vicinity of the effective display area is slightly thicker than that of areas other than this area. Therefore, it is possible to positively prevent irregularities in luminance in the vicinity of the effective display area due to timing differences in rises in the liquid crystal that are caused by thinness of the cell thickness in the vicinity of the display area due to the applied pressure during the substrate-bonding process. In addition, in the case of liquid crystal modules wherein compactness and thinness have been achieved, it is possible to eliminate irregularities in luminance due to light leakage as well as those caused by variations in retardation of the liquid crystal layer, by cancelling them with retardation in rises in the liquid crystal upon application of a voltage to the liquid crystal, which is caused by the fact that the cell thickness in the vicinity of the effective display area is slightly thicker than that of areas other than this area.

Consequently, a liquid crystal display element having further uniform display quality compared with the first arrangement can be achieved.

For a fuller understanding of the nature and advantages of the invention, reference should be made to the ensuing detailed description taken in conjunction with the accompanying drawings.

DESCRIPTION OF THE EMBODIMENTS

Referring to FIGS. 1 through 17, the following description will discuss one embodiment of the present invention.

Figure 1:
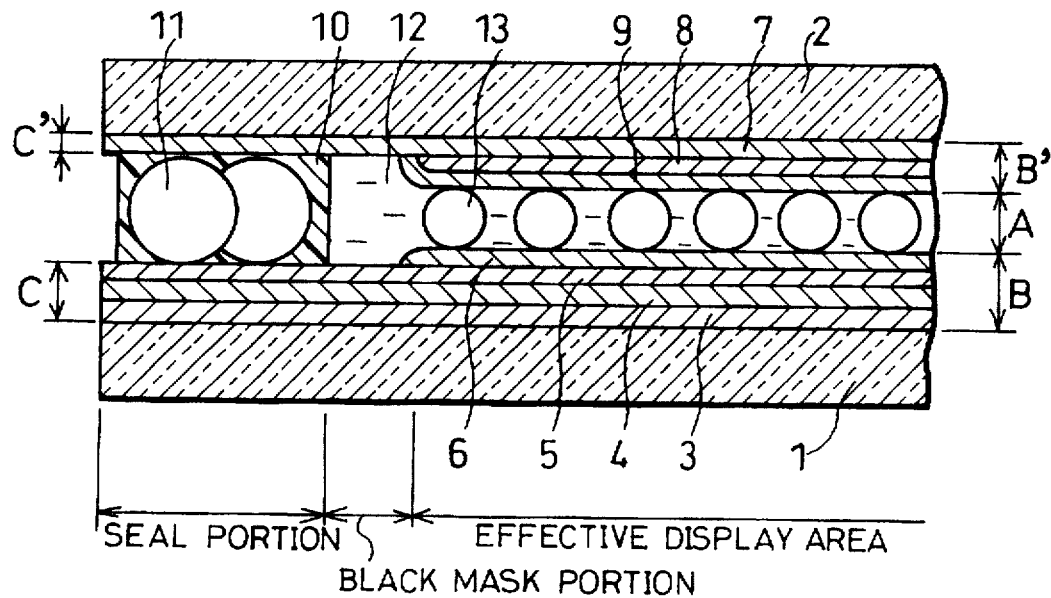
FIG. 1 is a cross-sectional view showing an STN color liquid crystal display element of one embodiment of the present invention.

As illustrated in FIG. 1, in the STN color liquid crystal display element of the present embodiment, a pair of glass substrates 1 and 2 (substrates) are placed face to face with each other. On the substrate-facing surface of one of the glass substrates 1, respective thin films, including the first thin film 3, the second thin film 4, the third thin film 5 and the fourth thin film 6, are formed in this order, and on the substrate-facing surface of the other glass substrate 2, respective thin films, including the fifth thin film 7, the sixth thin film 8 and the seventh thin film 9, are formed in this order. These paired glass substrates 1 and 2, which have the various thin films formed thereon, are bonded to each other through a seal material 10 that is located at the surrounding portion of the substrates, and the liquid crystal is sealed in a gap between the glass substrates 1 and 2 that is surrounded by the seal material 10, so as to form a liquid crystal layer 12.

Liquid-crystal-layer spacers 13 are placed in the gap between the glass substrates 1 and 2 that is surrounded by the seal material 10, and seal-portion spacers 11 (spacers) are placed in the seal material 10. Plastic beads are used as the liquid-crystal-layer spacers 13, and in this embodiment, glass beads with a spherical particle shape, which are free from overlaps among the spacers, are used as the seal-portion spacers 11. Here, the rate of the seal-portion spacers 11 to the seal material 10 is set to 7 to 20 Wt %, and more preferably to 10 to 20 Wt %, and the particle diameter R of the seal-portion spacers 11 is represented by:

R=(the layer thickness A of a liquid crystal layer 12)+(the total thickness B+B' of various thin films located within the effective display area)−(the total thickness C+C' of various thin films located in the seal portion)+(0.1 to 0.2 μm).

The rate of the seal-portion spacer 11 to the seal material 10 and the particle diameter of the seal-portion spacers 11 are set by carrying out the following simulating processes and the various corresponding experiments and by checking out the presence or absence of irregularities in luminance and analyzing the thin-film portions by the use of a scanning-type electron microscope.

In other words, based upon the ideas of the present invention for use in manufacturing STN color liquid crystal display elements, the inventors of the present invention carried out simulating processes with respect to deformation of the glass substrates upon application of the pressure during a glass-substrate-bonding process by using the finite-element analysis.

Figure 2:
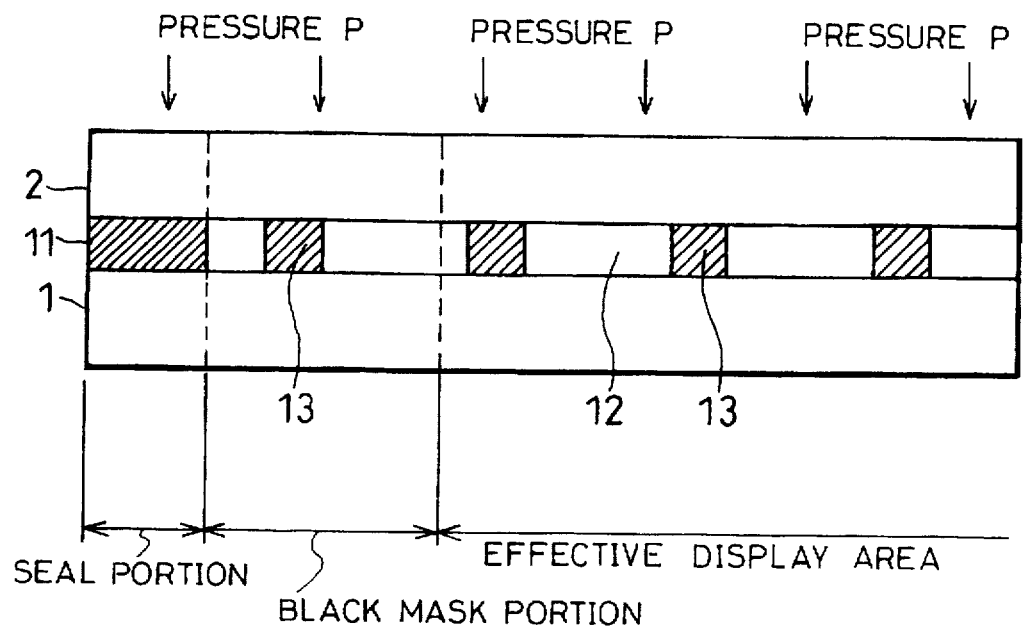
FIG. 2 is a two-dimensional analytic model of the STN color liquid crystal display element of FIG. 1.

FIG. 2 is a two-dimensional analytic model of the STN color liquid crystal display element that was used in the finite-element analysis. Boundary conditions are given as follows: Various thin films on the glass substrates 1 and 2 are formed up to the seal portion, and their thickness is uniform. The glass substrate 1 on the lower side is securely fixed, and only the glass substrate 2 on the upper side is supposed to be deformed. Further, the liquid-crystal-layer spacers 13 are plastic beads, where the seal-portion spacers 11 are glass beads, and the particle diameter thereof is the same as the cell thickness within the effective display area. Therefore, the cell thickness in the vicinity of the effective display area (black-mask portion in the drawing) is slightly thinner than the cell thickness within the effective display area, or the difference between these thicknesses does not exceed zero although it approaches zero infinitely. Here, the cell thickness in the vicinity of the effective display area never becomes thicker than the cell thickness within the effective display area. Moreover, the same simulating processes can be carried out when, in the initial boundary condition, the thin films on the glass substrates 1 and 2 are formed in a different manner between the seal portion and the inside of the effective display area.

Figure 3:
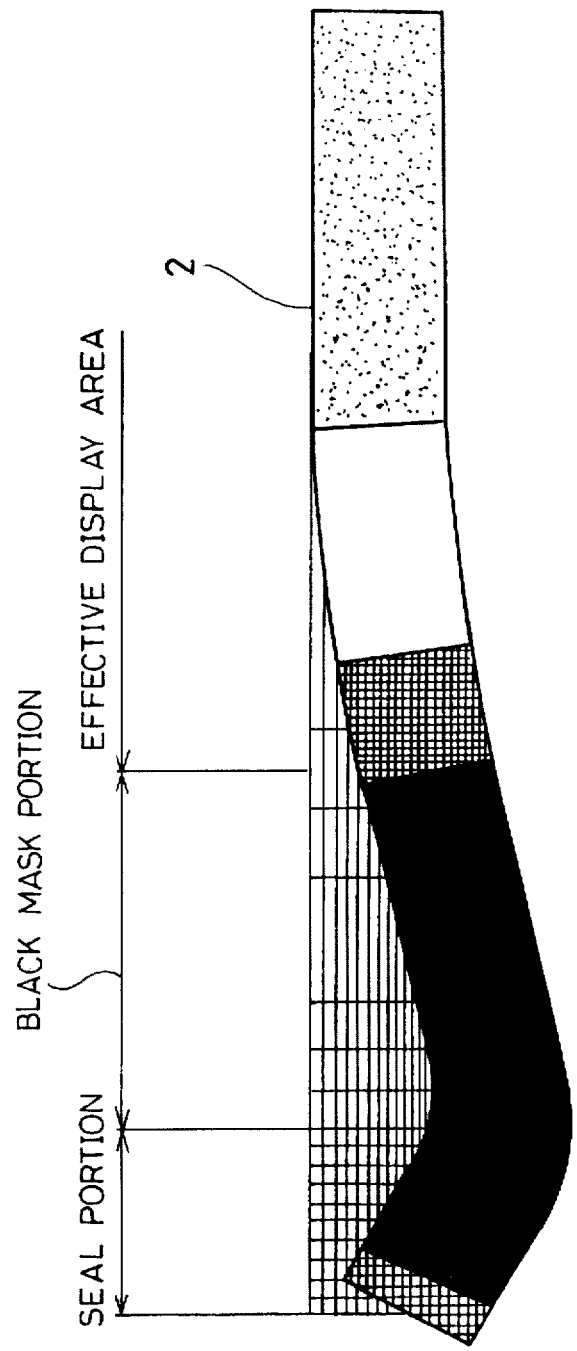
FIG. 3 is an explanatory drawing that shows a deformed state upon application of a pressure during a glass-substrate (upper substrate)-bonding process, which is obtained through the finite-element analysis.

FIG. 3 is an explanatory drawing that shows a deformed state of the glass substrate 2 upon application of the pressure during a substrate-bonding process thereof, which was obtained through the finite-element analysis. This drawing indicates that the cell thickness of the black masking section in the vicinity of the effective display area has become thinner than the cell thickness within the effective display area due to the deformation.

Figure 4:
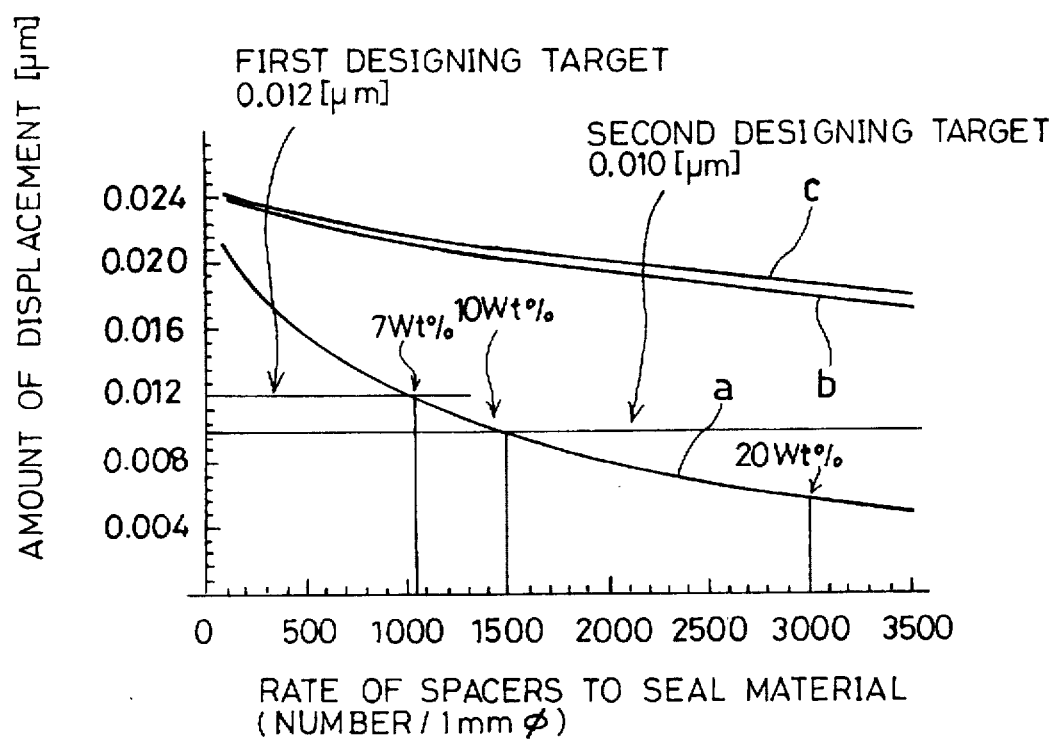
FIG. 4 is a graph that shows the amount of displacement of a cell thickness in the vicinity of an effective display area when the rate of spacers to be mixed in a seal material is used as a parameter.

FIG. 4 is a graph that shows the amount of displacement of a cell thickness in the vicinity of the effective display area when the rate of spacers 11 to be mixed in a seal material 10 and the kinds of the spacers to be used as the seal-portion spacers 11 are used as parameters. Here, the rate of spacers to be mixed in a seal material, which is plotted on the lateral axis of the graph of FIG. 4, is represented by the number of seal-portion spacers 11 that exist within 1 mmφ under the microscope.

Glass beads having the young's modulus of 7000 kgf/mm² and high-hardness plastic beads of two types having the respective young's moduli of 360 kgf/mm² and 300 kgf/mm² were used as the seal-portion spacers 11. The amount of displacement in the case of the glass beads is represented by a; the amount of displacement in the case of the plastic beads having the young's modulus of 360 kgf/mm² is represented by b; and the amount of displacement in the case of the plastic beads having the young's modulus of 300 kgf/mm² is represented by c.

This graph indicates that, in the case of the glass beads, the greater the rate thereof to the seal material 10, the more infinitely the amount of displacement of the cell thickness in the vicinity of the effective display area approaches 0 µm.

The fact that the amount of displacement approaches 0 µm also means that the embedment of the seal-portion spacers 11 onto the thin-film layers formed on the glass substrates 1 and 2 further approaches 0 µm.

In contrast, when the rate of the glass beads to the seal material 10 exceeded 20 Wt % (3000/1 mmφ), they became hard to be mixed with each other, and it was found that problems, such as "faded portions", occur when the seal material was printed.

For this reason, STN color liquid crystal display elements of five types, which will be described in Embodiments 1 through 5, were prepared by mixing the seal material with its rate increased in a stepped manner in the range of 4 to 20 Wt %, and thus the presence or absence of irregularities in luminance was checked out and the thin-film portions were analyzed by the use of a scanning-type electron microscope.

As a result, it was found that the amount of embedment of the seal-portion spacers 11 onto the thin-film layers could be suppressed from 7 Wt % on with suppressed irregularities in luminance, and that it was virtually suppressed from 10 Wt % on with no irregularities in luminance.

Accordingly, in the liquid crystal display element of the present embodiments, the rate of seal-portion spacers 11 to the seal material 10 is set to the range of 7 Wt % (1050/1 mmφ) to 20 Wt % to achieve the first designing target, that is, an amount of displacement of 0.012 µm of the cell thickness in the vicinity of the effective display area at which an improvement was seen in irregularities in luminance in the vicinity of the effective display area. Further, the rate of seal-portion spacers 11 to the seal material 10 is set to the range of 10 Wt % (1500/1 mmφ) to 20 Wt % to achieve the second designing target, that is, an amount of displacement of 0.01 µm of the cell thickness in the vicinity of the effective display area at which irregularities in luminance were virtually suppressed in the vicinity of the effective display area.

Moreover, the particle diameter R of the seal-portion spacers 11 was set to be greater by 0.1 to 0.2 µm than the particle diameter of the spacer that was obtained by compensating for the difference of the total film thickness of the various thin films between the seal portion and the inside of the effective display area. This setting was incorporated so as to take into consideration irregularities in luminance caused by various reasons, such as irregularities in luminance that were caused by the differences in rises in the liquid crystal due to thinness of the cell thickness in the vicinity of the display area, irregularities in luminance due to light leakage from the back light when assembled into a liquid crystal module, and irregularities in luminance caused by variations in retardation of the liquid crystal layer 12 due to heat generation of the back light. In other words, this setting allowed the cell thickness in the vicinity of the effective display area to become slightly thicker than that of areas other than this area; therefore, it is possible to positively prevent irregularities in luminance in the vicinity of the effective display area due to timing differences in rises in the liquid crystal that are caused by thinness of the cell thickness in the vicinity of the display area due to the applied pressure during the substrate-bonding process of the glass substrates 1 and 2. Moreover, in the case of liquid crystal modules wherein compactness and thinness have been achieved, it is possible to eliminate irregularities in luminance due to light leakage as well as those caused by variations in retardation of the liquid crystal layer 12, by cancelling them with retardation in rises in the liquid crystal upon application of a voltage to the liquid crystal, which is caused by the fact that the cell thickness in the vicinity of the effective display area is slightly thicker than that of areas other than this area.

The following description will discuss embodiments of the STN color liquid crystal display element of the present invention and comparative examples that are used for comparison purposes:

[EMBODIMENT 1]

Figure 5:
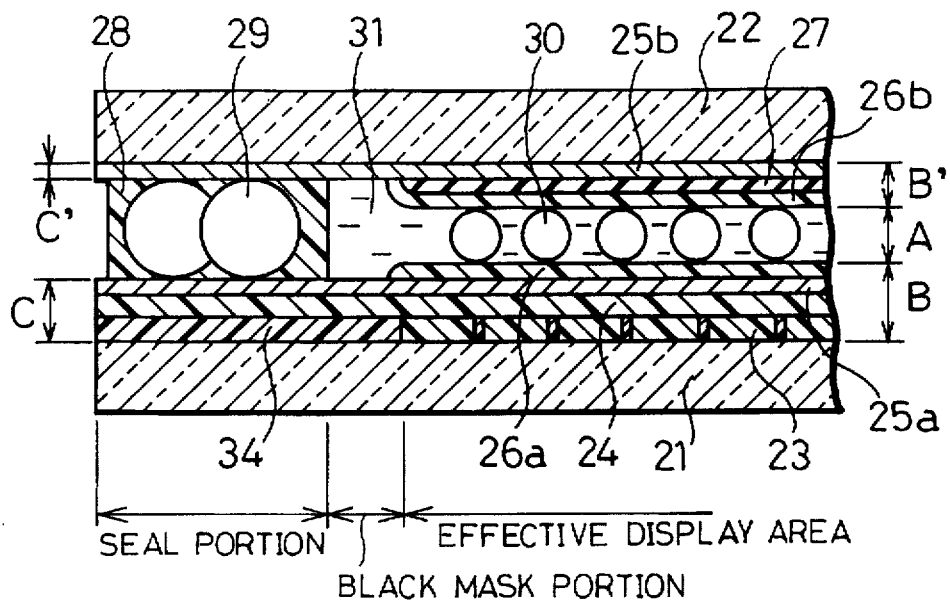
FIG. 5 is a cross-sectional view showing an STN color liquid crystal display element of Embodiment 1.
Figure 6:
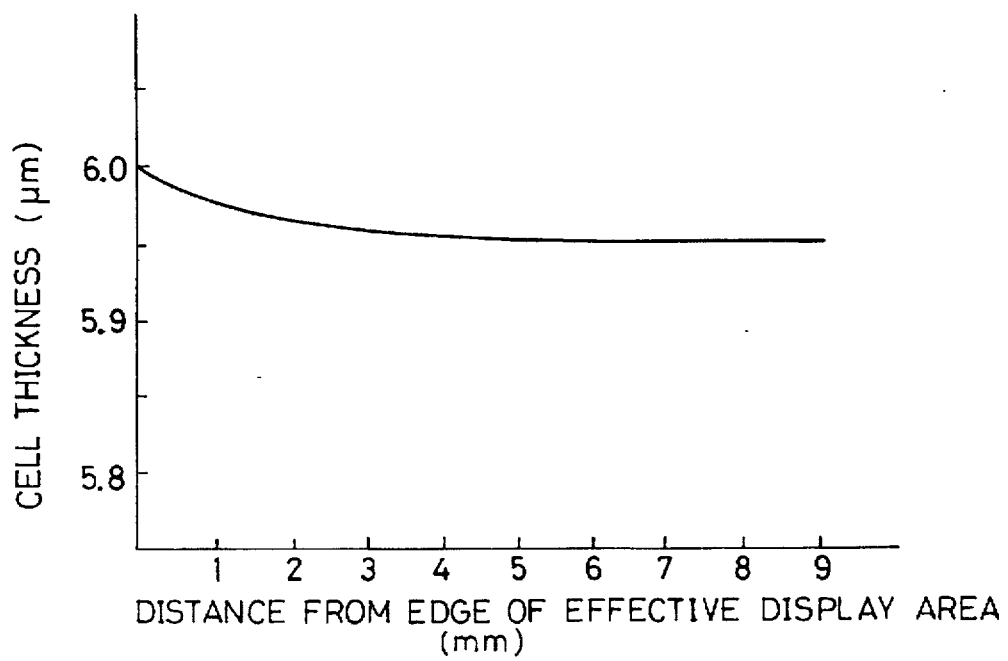
FIG. 6 is a graph showing a cell thickness in the vicinity of the effective display area of the STN color liquid crystal display element of FIG. 5.

Referring to FIGS. 5 and 6, the following description will discuss one embodiment of the present invention.

As illustrated in FIG. 5, the STN color liquid crystal display element of the present embodiment is provided with a pair of glass substrates 21 and 22 (substrates) that are placed face to face with each other. On the substrate-facing surface of one of the glass substrate 21, a color filter layer 23 (thin film) and a black mask 34 are formed on the same surface, and an overcoat layer 24 (thin film) is formed on the entire surface so as to cover them. On them are further formed a display-use electrode 25a (thin film) and an alignment film 26a (thin film) successively. The black mask 34, which is made of a resin, is formed with the same film thickness as the color filter layer 23. On the substrate-facing surface of the other glass substrate 22, a display-use electrode 25b (thin film), an insulating film 27 (thin film) and an alignment film 26b (thin film) are formed in this order.

The paired glass substrates 21 and 22, whereon these various thin films are formed, are bonded to each other through a seal material 28 that is located at the surrounding portion of the substrates, and glass beads 29 (spacers) are mixed into the seal material 28. Further, the liquid crystal is sealed in a gap between the glass substrates 21 and 22 that is surrounded by the seal material 28 so as to form a liquid crystal layer 31, and plastic beads 30 that have a particle diameter of 6 μm and that serve as liquid-crystal-layer spacers are placed therein.

Here, in the liquid crystal display element of the present embodiment, based on the results of the aforementioned finite-element analysis, the particle diameter of the glass beads 29 that are to be mixed into the seal material 28 is set at 6.3 μm, this value being obtained as follows: To 6.2 μm, which is obtained through the following calculation: the total thickness of various thin films within the effective display area (B+B'=4.25 μm)–the total thickness of various thin films that exist in the seal portion (C+C'=4.0 μm)+the thickness of the liquid crystal layer 31 (A=5.95 μm, which is set to be smaller than the particle diameter of the initial-stage plastic beads since the deformation of the plastic beads upon application of pressure during a bonding process is taken into consideration), is further added 0.1 μm in order to take into consideration irregularities in luminance due to light leakage from the back light when assembled into a liquid crystal module and irregularities in luminance caused by variations in retardation of the liquid crystal layer due to heat generation of the back light. Then, the glass beads 29 are mixed at a rate of 12 Wt % to the seal material 28.

With respect to the above-mentioned STN color liquid crystal display element, the cell thickness in the vicinity of the effective display area was examined. As a result, it was found that it became thicker by 0.05 μm than the cell thickness of areas other than the vicinity of the effective display area, as shown in FIG. 6. When the STN color liquid crystal display elements were assembled into a liquid crystal module and turned on to display images, it was possible to obtain uniform display quality without any irregularities in luminance in the vicinity of the effective display area. Further, when the surface of the overcoat layer 24 of the seal portion was analyzed by using a scanning-type electron microscope, no embedment of the glass beads 29 was found.

[EMBODIMENT 2]

Figure 7:
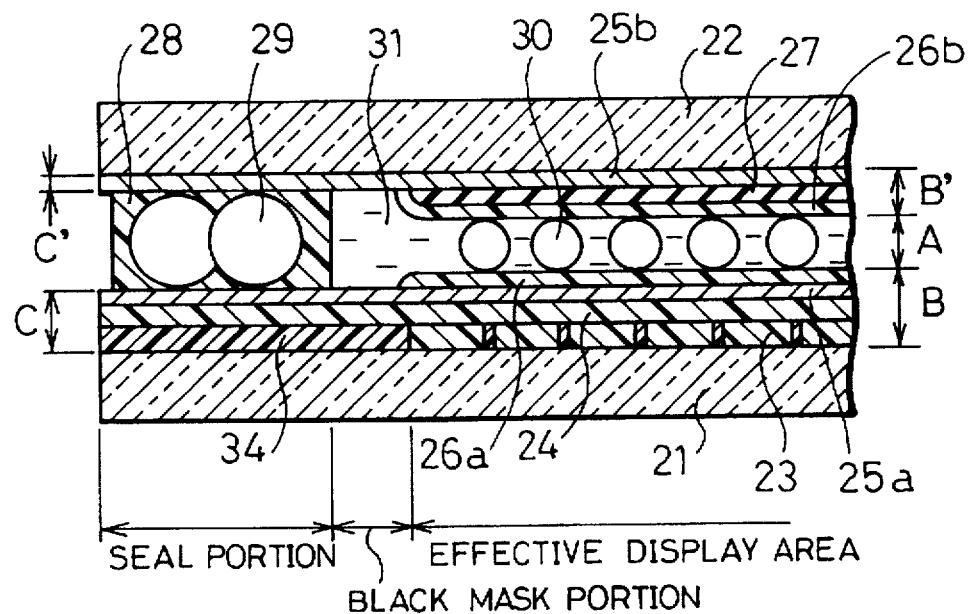
FIG. 7 is a cross-sectional view showing an STN color liquid crystal display element of Embodiment 2.
Figure 8:
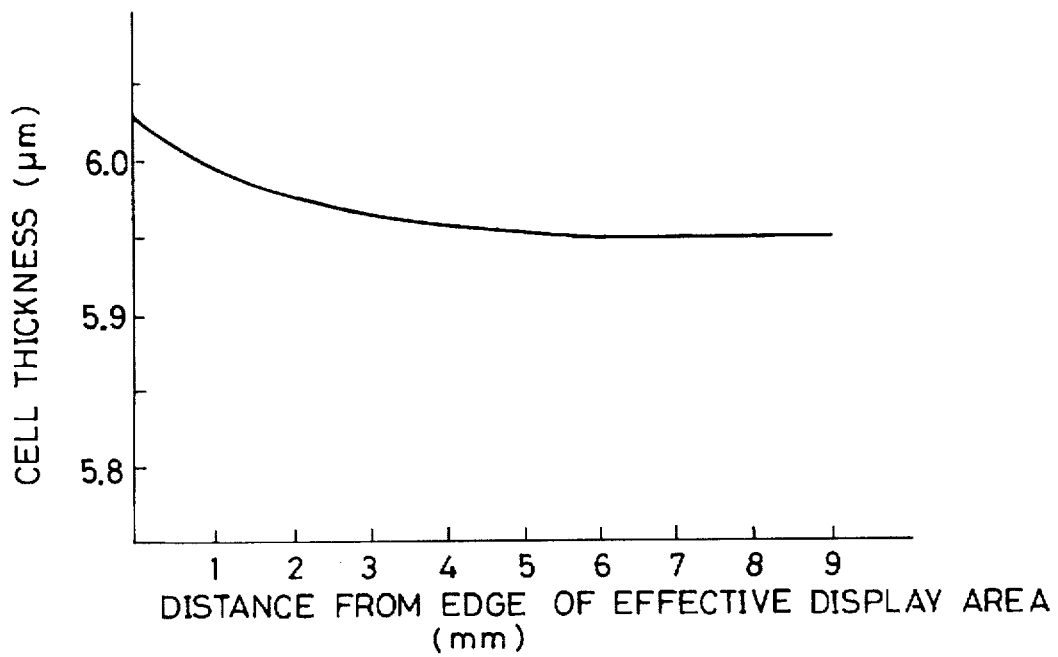
FIG. 8 is a graph showing a cell thickness in the vicinity of the effective display area of the STN color liquid crystal display element of FIG. 7.

Referring to FIGS. 7 and 8, the following description will discuss another embodiment of the present invention. Here, for convenience of explanation, those members that have the same functions and that are described in the above-mentioned embodiment are indicated by the same reference numerals and the description thereof is omitted.

As illustrated in FIG. 7, the STN color liquid crystal display element of the present embodiment, which has the same structure as the STN color liquid crystal display element of the aforementioned Embodiment 1 shown in FIG. 5, is characterized in that the particle diameter of the glass beads 29 to be mixed into the seal material 28 is set at 6.4 μm, which is greater than that of the aforementioned Embodiment 1 by 0.1 μm (by 0.2 μm compared with the result of the simulating process). Then, the glass beads 29 are mixed at a rate of 12 Wt % to the seal material 28.

With respect to the above-mentioned STN color liquid crystal display element, the cell thickness in the vicinity of the effective display area was examined. As a result, it was found that it became thicker by 0.08 μm than the cell thickness of areas other than the vicinity of the effective display area, as shown in FIG. 8. When the STN color liquid crystal display elements were assembled into a liquid crystal module and turned on to display images, it was possible to obtain uniform display quality without any irregularities in luminance in the vicinity of the effective display area. Further, when the surface of the overcoat layer 24 of the seal portion was analyzed by using a scanning-type electron microscope, no embedment of the glass beads 29 was found.

[EMBODIMENT 3]

Figure 9:
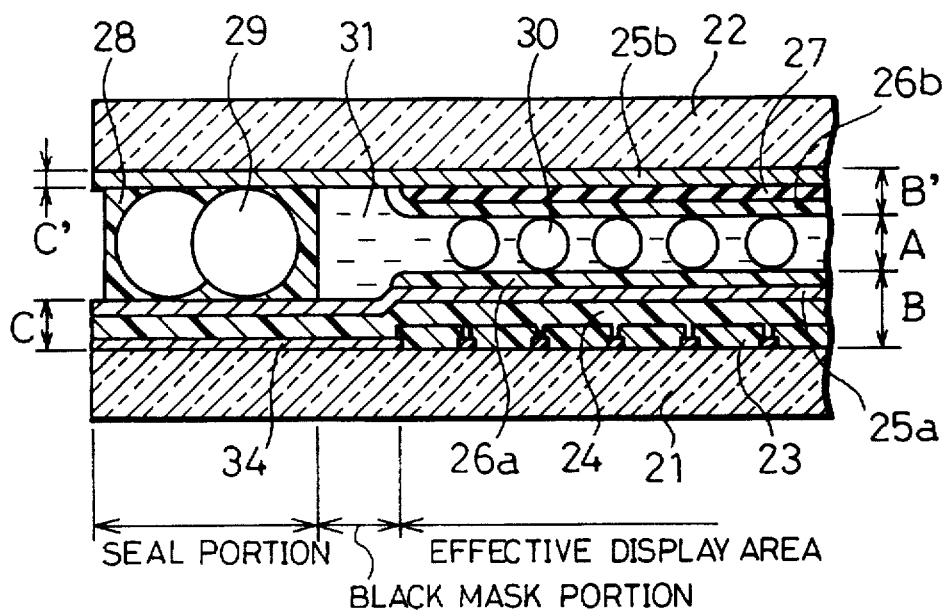
FIG. 9 is a cross-sectional view showing an STN color liquid crystal display element of Embodiment 3.
Figure 10:
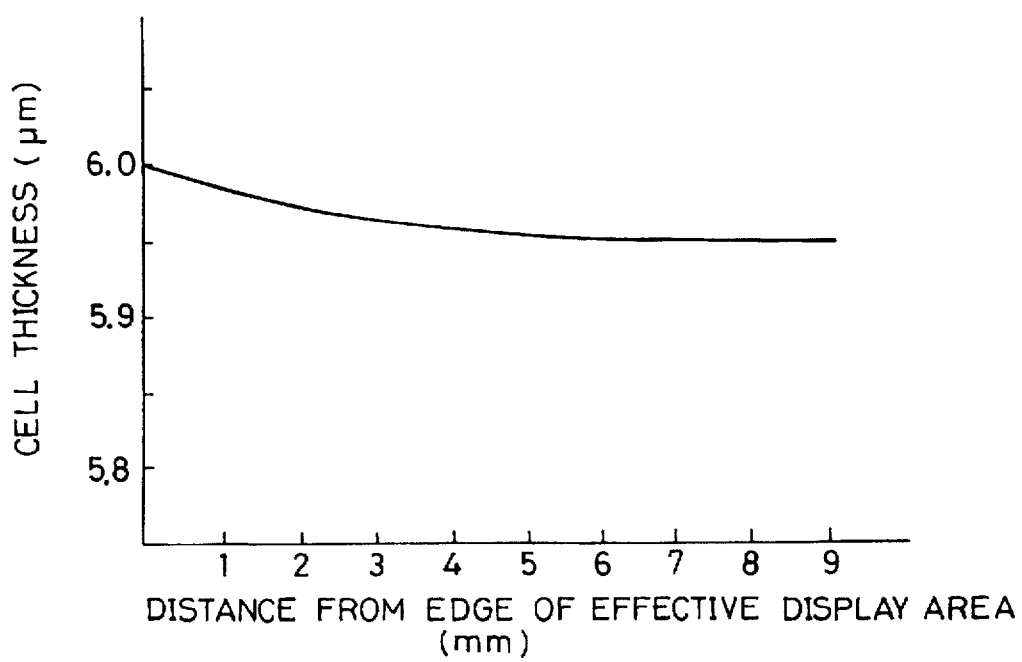
FIG. 10 is a graph showing a cell thickness in the vicinity of the effective display area of the STN color liquid crystal display element of FIG. 9.

Referring to FIGS. 9 and 10, the following description will discuss another embodiment of the present invention. Here, for convenience of explanation, those members that have the same functions and that are described in the above-mentioned embodiment are indicated by the same reference numerals and the description thereof is omitted.

As illustrated in FIG. 9, the STN color liquid crystal display element of the present embodiment differs from the STN color liquid crystal display element of the aforementioned Embodiment 1 shown in FIG. 5 in the material and film thickness of its black mask 34. In other words, the black mask 34 of Embodiment 1 is made of a resin and has the same film thickness as the color filter layer 23, where the black mask 34 of the liquid crystal display element of the present embodiment is made of a thin-film metal and has a film thickness thinner than that of the color filter layer 23, with the result that the thickness C of various thin films in the seal portion becomes thinner by the corresponding amount.

Here, in the liquid crystal display element of the present embodiment, based on the results of the aforementioned finite-element analysis, the particle diameter of the glass beads 29 that are to be mixed into the seal material 28 is set at 7.7 μm, this value being is obtained as follows: To 7.6 μm, which is obtained through the following calculation, the total thickness of various thin films within the effective display area (B+B'=4.25 μm)–the total thickness of various thin films that exist in the seal portion (C+C'=2.6 μm)+the thickness of the liquid crystal layer 31 (A=5.95 μm), is further added 0.1 μm in order to take into consideration irregularities in luminance due to light leakage from the back light when assembled into a liquid crystal module and irregularities in luminance caused by variations in retardation of the liquid crystal layer due to heat generation of the back light. Then, the glass beads 29 are mixed at a rate of 12 Wt % to the seal material 28.

With respect to the above-mentioned STN color liquid crystal display element, the cell thickness in the vicinity of the effective display area was examined. As a result, it was found that it became thicker by 0.05 μm than the cell thickness of areas other than the vicinity of the effective display area, as shown in FIG. 10. When the STN color liquid crystal display elements were assembled into a liquid crystal module and turned on to display images, it was possible to obtain uniform display quality without any irregularities in luminance in the vicinity of the effective display area. Further, when the surface of the overcoat layer 24 of the seal portion was analyzed by using a scanning-type electron microscope, no embedment of the glass beads 29 was found.

[EMBODIMENT 4]

Figure 11:
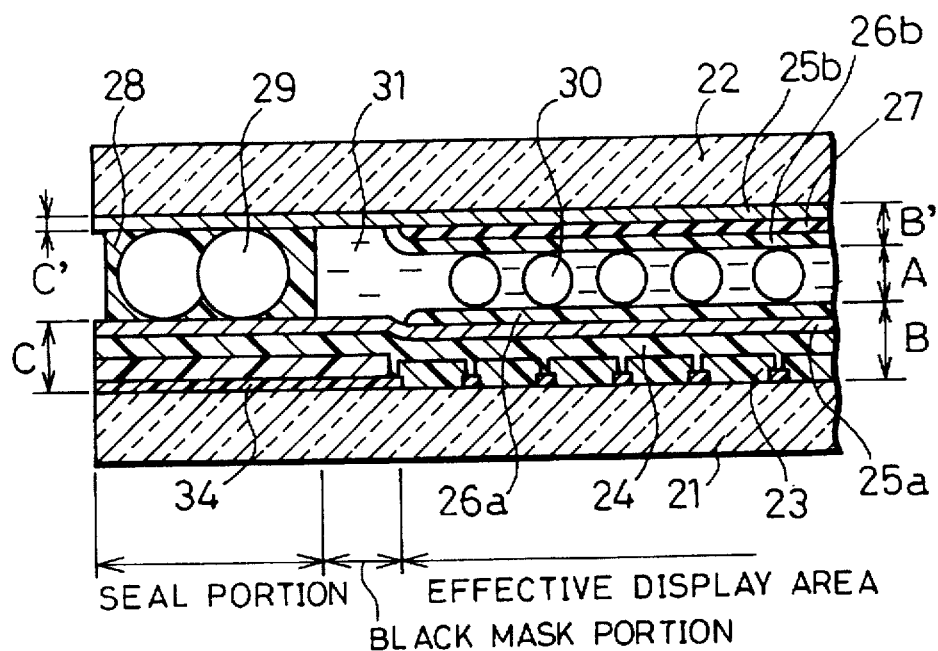
FIG. 11 is a cross-sectional view showing an STN color liquid crystal display element of Embodiment 4.
Figure 12:
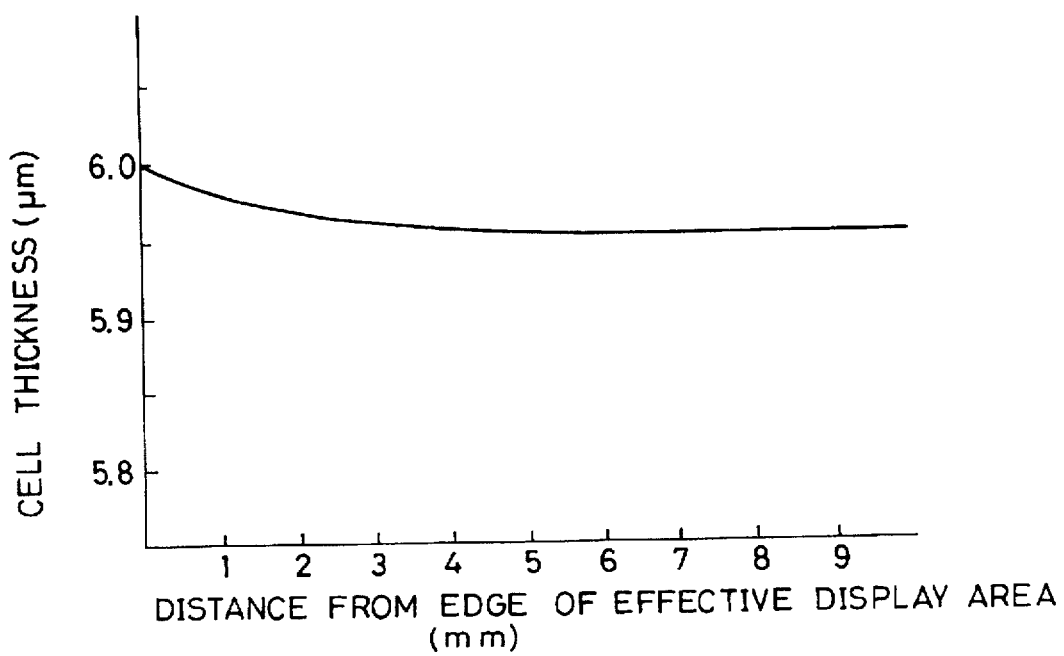
FIG. 12 is a graph showing a cell thickness in the vicinity of the effective display area of the STN color liquid crystal display element of FIG. 11.

Referring to FIGS. 11 and 12, the following description will discuss another embodiment of the present invention. Here, for convenience of explanation, those members that have the same functions and that are described in the above-mentioned embodiment are indicated by the same reference numerals and the description thereof is omitted.

As illustrated in FIG. 11, the STN color liquid crystal display element of the present embodiment differs from the STN color liquid crystal display element of the aforementioned Embodiment 3 shown in FIG. 9 in the formation area of its color filter layer 23. In other words, the color filter layer 23 of Embodiment 3 is not formed in the seal portion, where the color filter layer 23 of the liquid crystal display element of the present embodiment is formed up onto the black mask 34 in the seal portion, with the result that the thickness C of various thin films in the seal portion becomes thicker by the corresponding amount.

Here, in the liquid crystal display element of the present embodiment, based on the results of the aforementioned finite-element analysis, the particle diameter of the glass beads 29 that are to be mixed into the seal material 28 is set at 6.2 μm, this value being obtained as follows: To 6.1 μm, which is obtained through the following calculation: the total thickness of various thin films within the effective display area (B+B'=4.25 μm)—the total thickness of various thin films that exist in the seal portion (C+C'=4.1 μm)+the thickness of the liquid crystal layer 31 (A=5.95 μm), is further added 0.1 μm in order to take into consideration irregularities in luminance due to light leakage from the back light when assembled into a liquid crystal module and irregularities in luminance caused by variations in retardation of the liquid crystal layer due to heat generation of the back light. Then, the glass beads 29 are mixed at a rate of 12 Wt % to the seal material 28.

With respect to the above-mentioned STN color liquid crystal display element, the cell thickness in the vicinity of the effective display area was examined. As a result, it was found that it became thicker by 0.05 μm than the cell thickness of areas other than the vicinity of the effective display area, as shown in FIG. 12. When the STN color liquid crystal display elements were assembled into a liquid crystal module and turned on to display images, it was possible to obtain uniform display quality without any irregularities in luminance in the vicinity of the effective display area. Further, when the surface of the overcoat layer 24 of the seal portion was analyzed by using a scanning-type electron microscope, no embedment of the glass beads 29 was found.

[EMBODIMENT 5]

Figure 13:
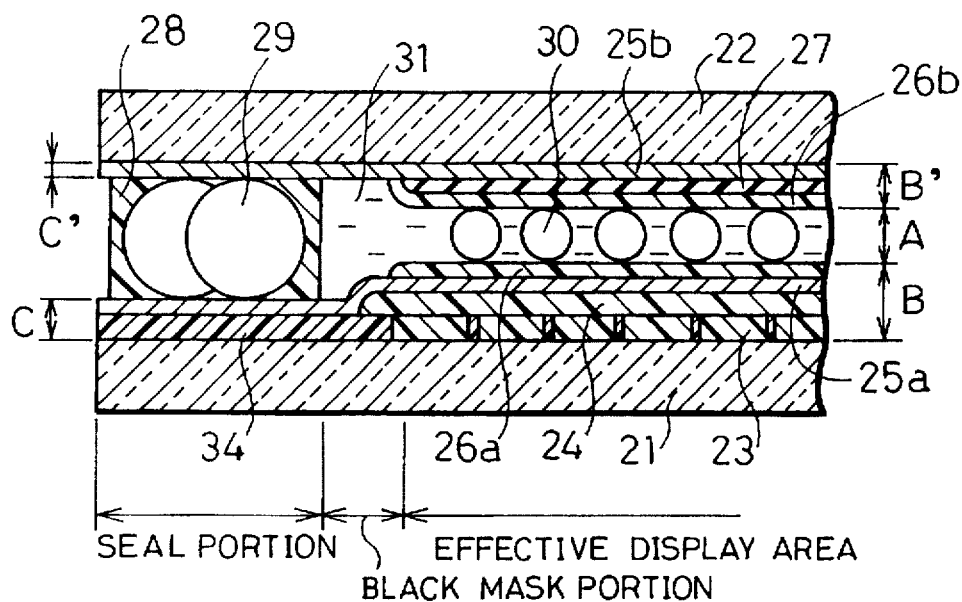
FIG. 13 is a cross-sectional view showing an STN color liquid crystal display element of Embodiment 5.
Figure 14:
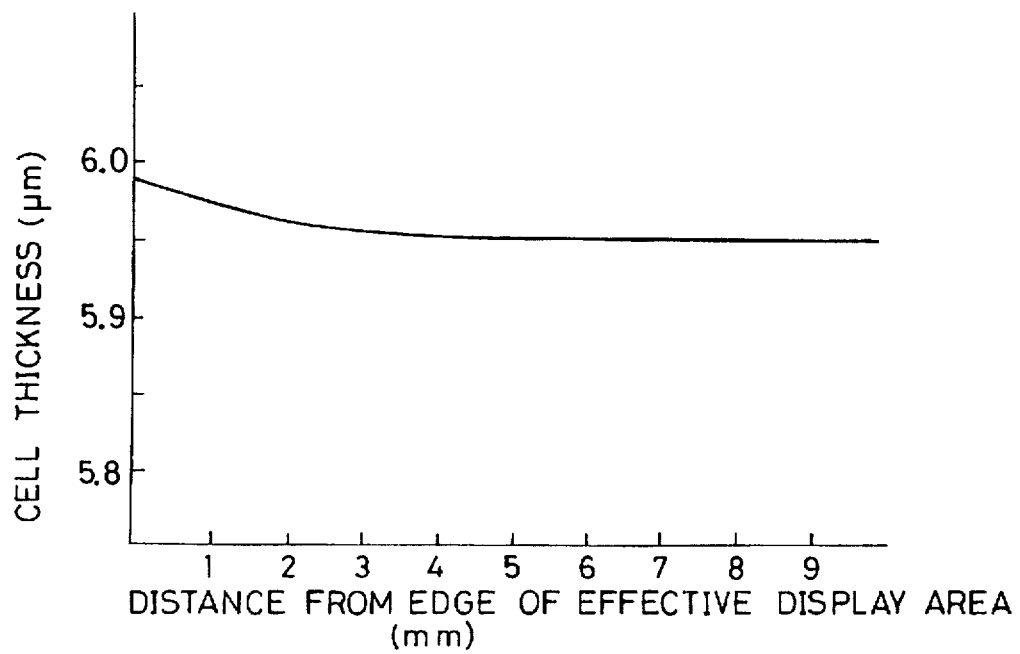
FIG. 14 is a graph showing a cell thickness in the vicinity of the effective display area of the STN color liquid crystal display element of FIG. 13.

Referring to FIGS. 13 and 14, the following description will discuss another embodiment of the present invention. Here, for convenience of explanation, those members that have the same functions and that are described in the above-mentioned embodiment are indicated by the same reference numerals and the description thereof is omitted.

As illustrated in FIG. 13, the STN color liquid crystal display element of the present embodiment differs from the STN color liquid crystal display element of the aforementioned Embodiment 1 shown in FIG. 5 in the formation area of its overcoat layer 24. In other words, the overcoat layer 24 of Embodiment 1 is formed up into in the seal portion, where the overcoat layer 24 of the present embodiment is not formed up into the seal portion, with the result that the thickness C of various thin films in the seal portion becomes thinner by the corresponding film thickness of the overcoat layer 24.

Here, in the liquid crystal display element of the present embodiment, based on the results of the aforementioned finite-element analysis, the particle diameter of the glass beads 29 that are to be mixed into the seal material 28 is set at 8.3 μm, this value being obtained as follows: To 8.2 μm, which is obtained through the following calculation: the total thickness of various thin films within the effective display area (B+B'=4.25 μm)—the total thickness of various thin films that exist in the seal portion (C+C'=2.0 μm)+the thickness of the liquid crystal layer 31 (A=5.95 μm), is further added 0.1 μm in order to take into consideration irregularities in luminance due to light leakage from the back light when assembled into a liquid crystal module and irregularities in luminance caused by variations in retardation of the liquid crystal layer due to heat generation of the back light. Then, the glass beads 29 are mixed at a rate of 12 Wt % to the seal material 28.

With respect to the above-mentioned STN color liquid crystal display element, the cell thickness in the vicinity of the effective display area was examined. As a result, it was found that it became thicker by 0.05 μm than the cell thickness of areas other than the vicinity of the effective display area, as shown in FIG. 14. When the STN color liquid crystal display elements were assembled into a liquid crystal module and turned on to display images, it was possible to obtain uniform display quality without any irregularities in luminance in the vicinity of the effective display area. Further, when the surface of the overcoat layer 24 of the seal portion was analyzed by using a scanning-type electron microscope, no embedment of the glass beads 29 was found.

[EMBODIMENT 6]

Figure 15:
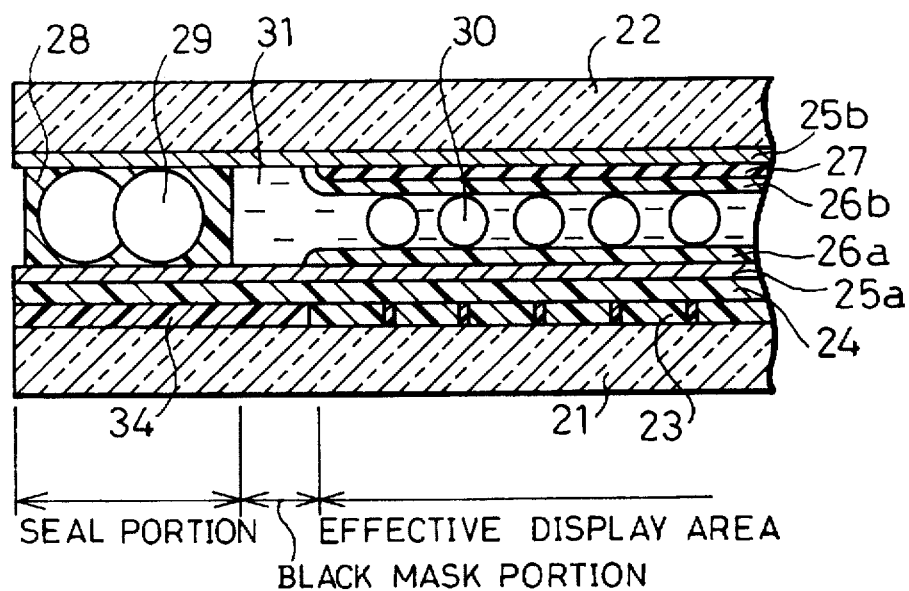
FIG. 15 is a cross-sectional view showing an STN color liquid crystal display element of Embodiment 6.
Figure 16:
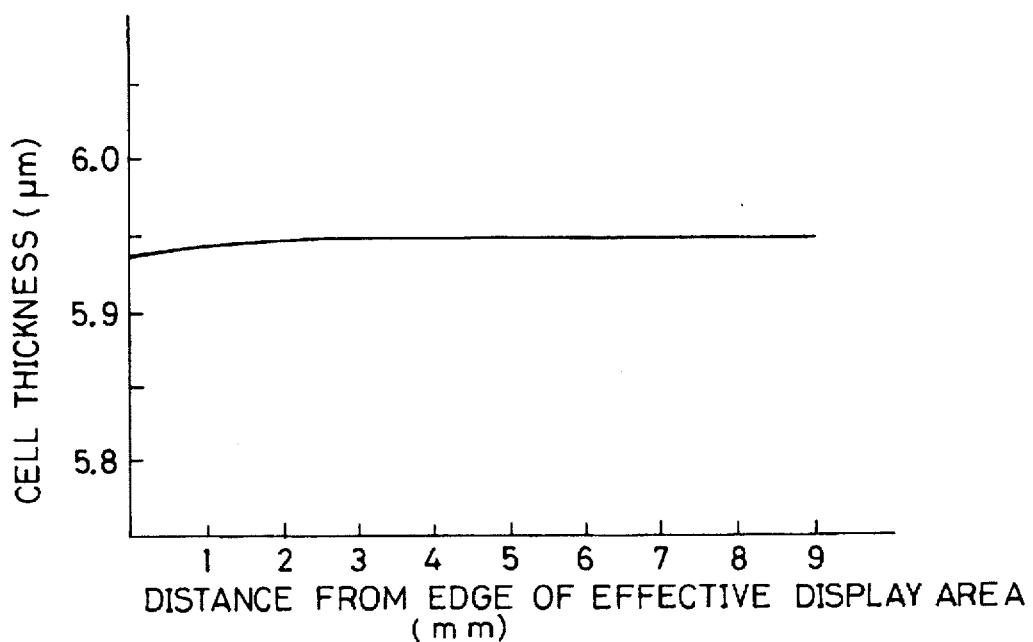
FIG. 16 is a graph showing a cell thickness in the vicinity of the effective display area of the STN color liquid crystal display element of FIG. 15.
Figure 17:
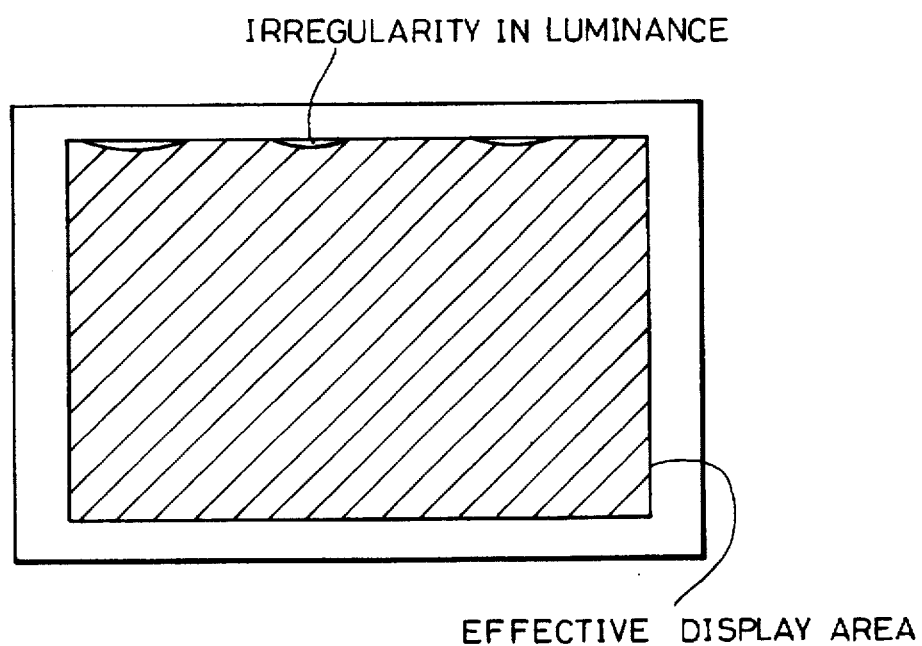
FIG. 17 is an explanatory view showing irregularities in luminance in the vicinity of the effective display area of the STN color liquid crystal display element of FIG. 15.

Referring to FIGS. 15 through 17, the following description will discuss another embodiment of the present invention. Here, for convenience of explanation, those members that have the same functions and that are described in the above-mentioned embodiment are indicated by the same reference numerals and the description thereof is omitted.

As illustrated in FIG. 15, the STN color liquid crystal display element of the present embodiment, which has the same structure as the STN color liquid crystal display element of the aforementioned Embodiment 1 shown in FIG. 5, is characterized in that the particle diameter of the glass beads 29 to be mixed into the seal material 28 is set at 6.2 μm that is the same as 6.2 μm obtained from the results of the simulating process. Then, the glass beads 29 are mixed at a rate of 12 Wt % to the seal material 28.

With respect to the above-mentioned STN color liquid crystal display element, the cell thickness in the vicinity of the effective display area was examined. As a result, it was found that it was virtually the same as, but was thinner only by 0.01 μm than the cell thickness of areas other than the vicinity of the effective display area, as shown in FIG. 16.

When the STN color liquid crystal display elements were assembled into a liquid crystal module and turned on to display images, slight irregularities in luminance, as shown in FIG. 17, occurred in the vicinity of the effective display area. Further, when the surface of the overcoat layer 24 of the seal portion was analyzed by using a scanning-type electron microscope, no embedment of the glass beads 29 was found.

[COMPARATIVE EXAMPLE 1]

Figure 18:
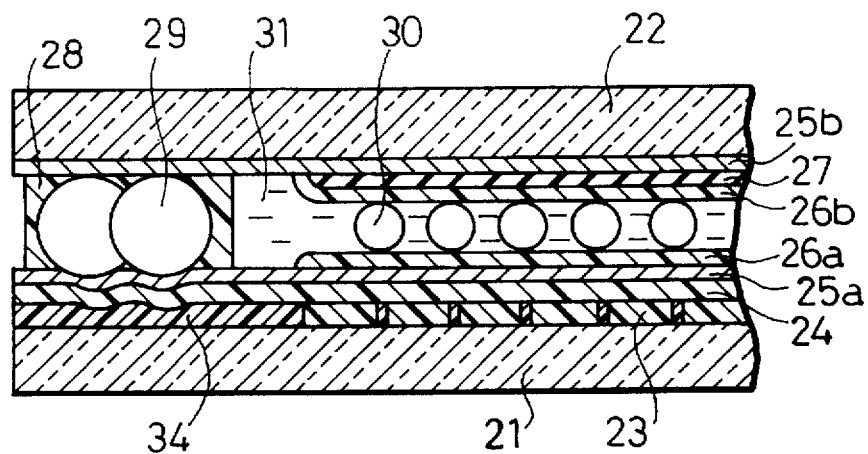
FIG. 18 is a cross-sectional view showing an STN color liquid crystal display element of Comparative Example 1.

A pair of glass substrates 20 and 21 whereon various thin films were formed in the same manner as the STN color liquid crystal display element of the aforementioned embodiment 1 were bonded to each other by using seal material 28 so as to provide an STN color liquid crystal display element shown in FIG. 18. Here, the seal material 28 was prepared as follows: The particle diameter of the glass beads 29 to be mixed into the seal material 28 was set at 6.9 μm and the glass beads 29 are mixed at a rate of 4 Wt % to the seal material 28.

Figure 19:
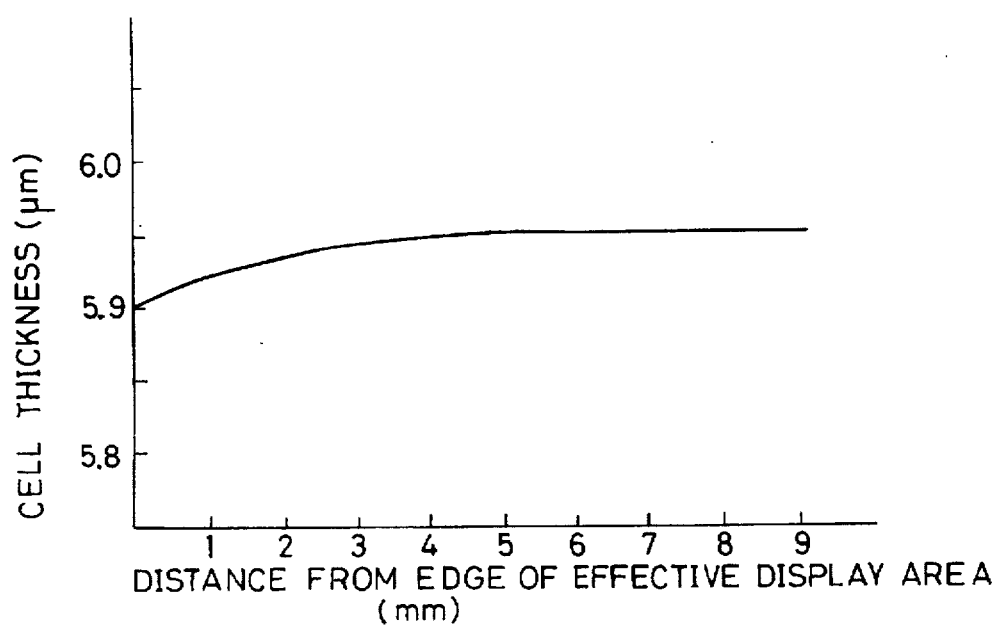
FIG. 19 is a graph showing a cell thickness in the vicinity of the effective display area of the STN color liquid crystal display element of FIG. 18.
Figure 20:
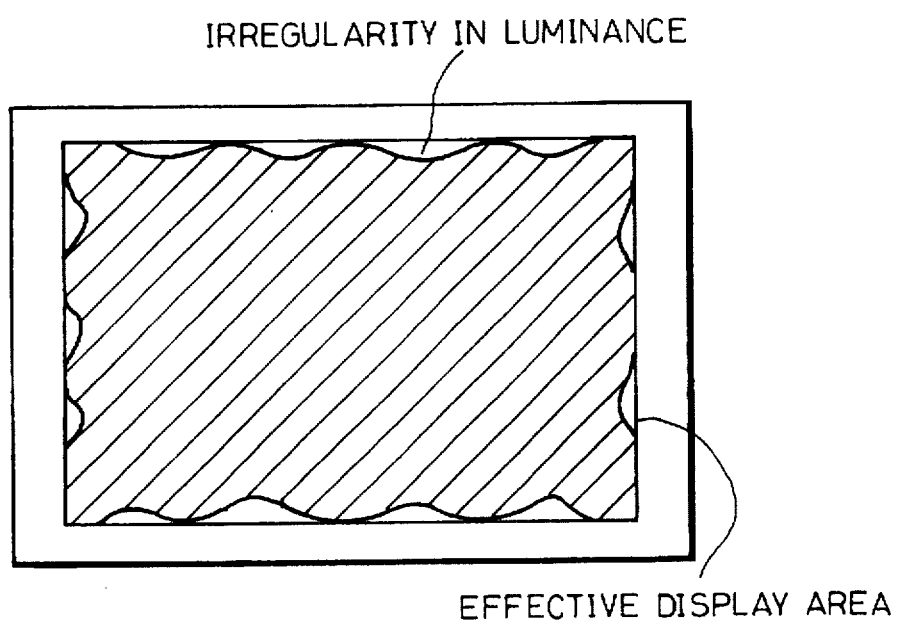
FIG. 20 is an explanatory view showing irregularities in luminance in the vicinity of the effective display area of the STN color liquid crystal display element of FIG. 18.

With respect to the above-mentioned STN color liquid crystal display element, the cell thickness in the vicinity of the effective display area was examined. As a result, it was found that it was thinner by 0.05 μm than the cell thickness of areas other than the vicinity of the effective display area, as shown in FIG. 19. When the STN color liquid crystal display elements were assembled into a liquid crystal module and turned on to display images, irregularities in luminance, as shown in FIG. 20, occurred in the vicinity of the effective display area. Further, when the surface of the overcoat layer 24 of the seal portion was analyzed, an embedment of the glass bead 29 of 0.4 μm was found.

[COMPARATIVE EXAMPLE 2]

Figure 21:
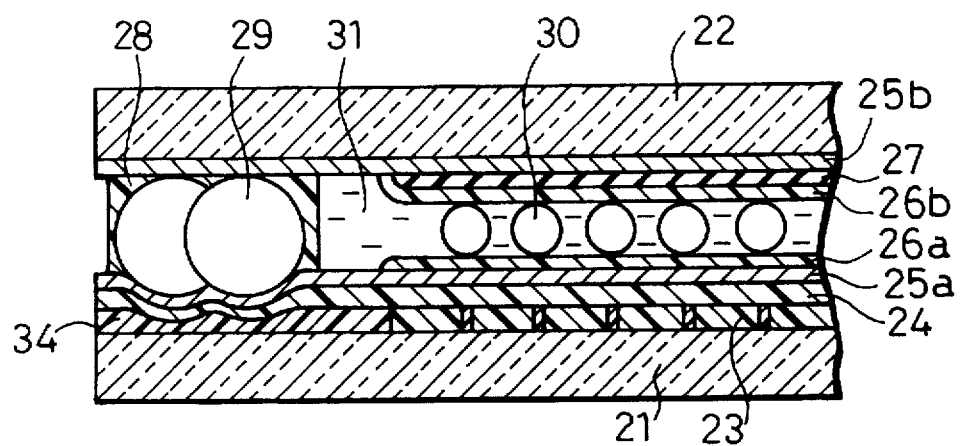
FIG. 21 is a cross-sectional view showing an STN color liquid crystal display element of Comparative Example 2.

In the STN color liquid crystal display element of the above-mentioned comparative example 1, the cell thickness in the vicinity of the effective display area became thinner than the cell thickness of areas other than the vicinity of the effective display area. In order to solve this problem, the particle diameter of the glass beads 29 to be mixed into the seal material 28 was further increased to 7.1 μm and an STN color liquid crystal display element, shown in FIG. 21, was manufactured.

Figure 22:
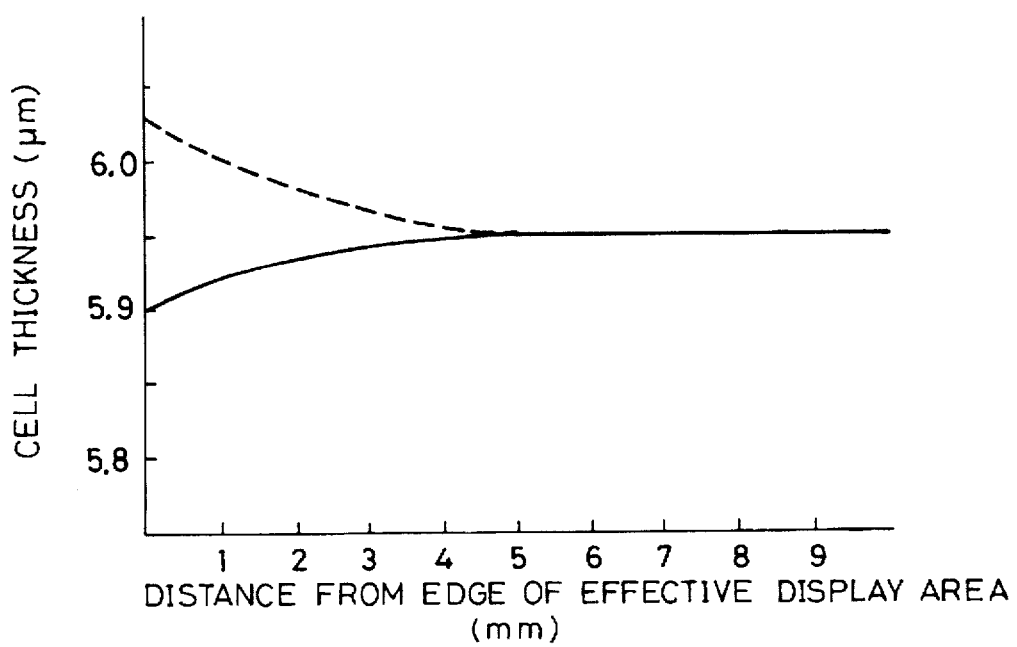
FIG. 22 is a graph showing a cell thickness in the vicinity of the effective display area of the STN color liquid crystal display element of FIG. 21.
Figure 23:
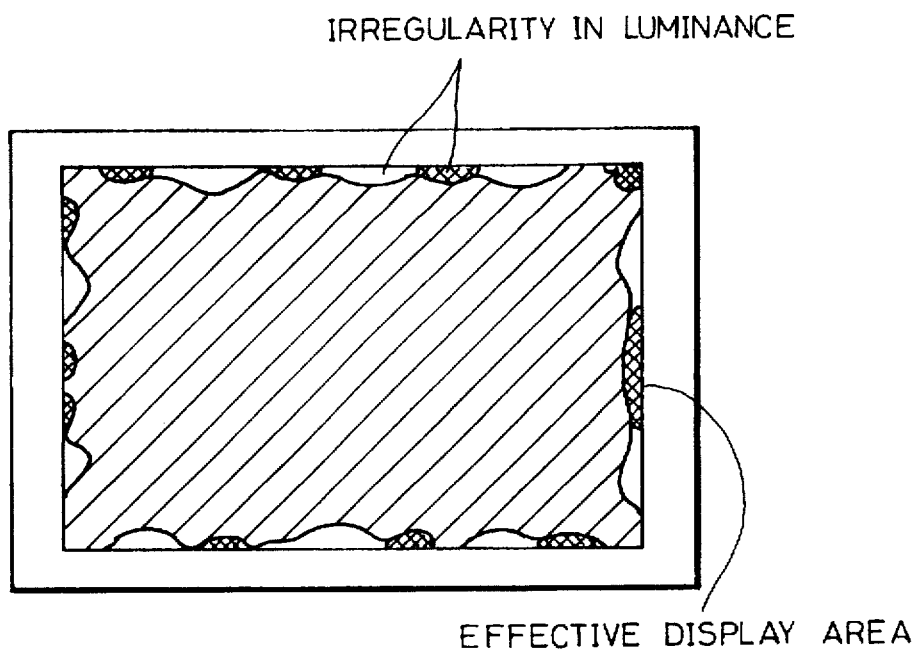
FIG. 23 is an explanatory view showing irregularities in luminance in the vicinity of the effective display area of the STN color liquid crystal display element of FIG. 21.

With respect to the above-mentioned STN color liquid crystal display element, the cell thickness in the vicinity of the effective display area was examined. As a result, as illustrated in FIG. 22, it was found that some portions had a thickness loss of 0.05 μm and other portions had a thickness gain of 0.1 μm, thereby resulting in an irregular state. When the STN color liquid crystal display elements were assembled into a liquid crystal module and turned on to display images, irregularities in luminance, as shown in FIG. 23, occurred in the vicinity of the effective display area. Further, when the surface of the overcoat layer 24 of the seal portion was analyzed, an embedment of the glass bead 29 of 0.6 μm was found.

[COMPARATIVE EXAMPLE 3]

Figure 24:
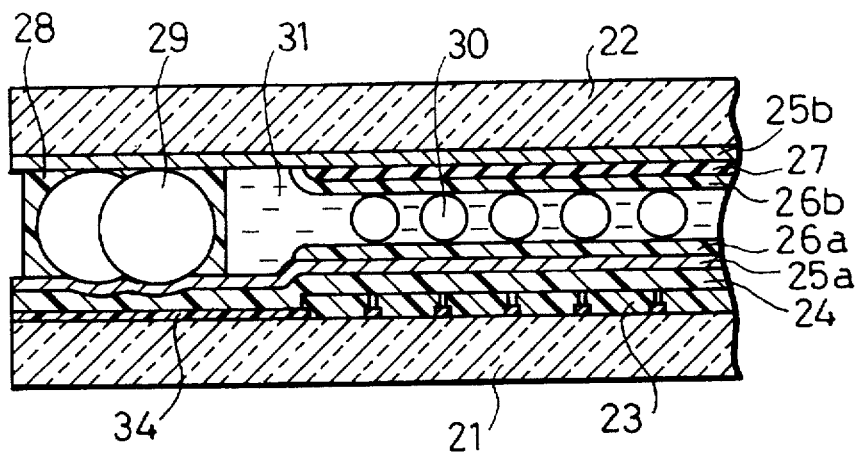
FIG. 24 is a cross-sectional view showing an STN color liquid crystal display element of Comparative Example 3.

A pair of glass substrates 20 and 21 whereon various thin films were formed in the same manner as the STN color liquid crystal display element of the aforementioned embodiment 3 were bonded to each other by using seal material 28 so as to provide an STN color liquid crystal display element shown in FIG. 24. Here, the seal material 28 was prepared as follows: The particle diameter of the glass beads 29 to be mixed into the seal material 28 was set at 8.1 μm and the glass beads 29 are mixed at a rate of 4 Wt % to the seal material 28.

Figure 25:
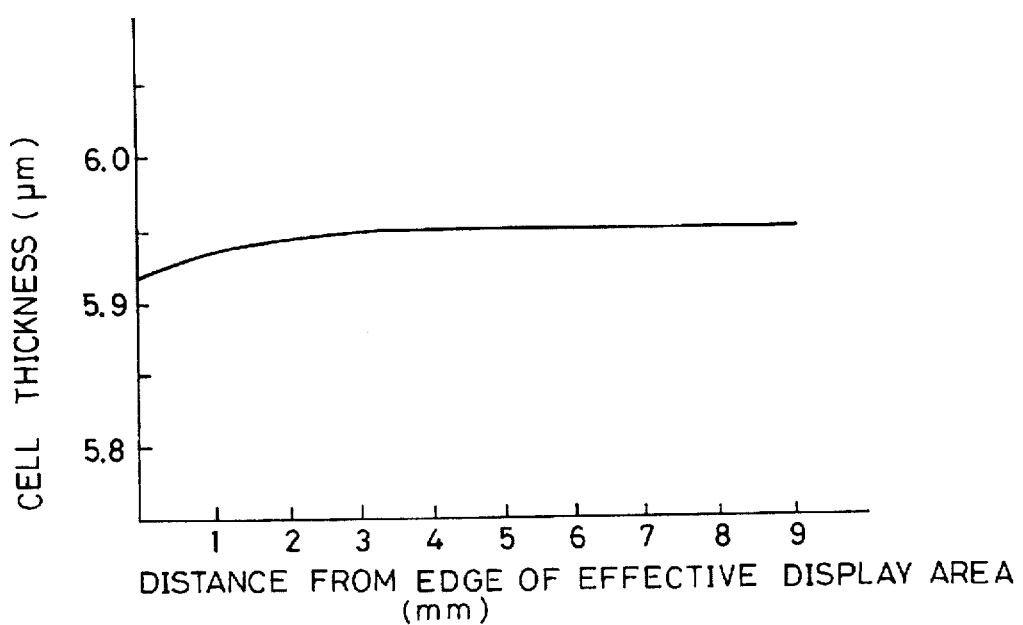
FIG. 25 is a graph showing a cell thickness in the vicinity of the effective display area of the STN color liquid crystal display element of FIG. 24.
Figure 26:
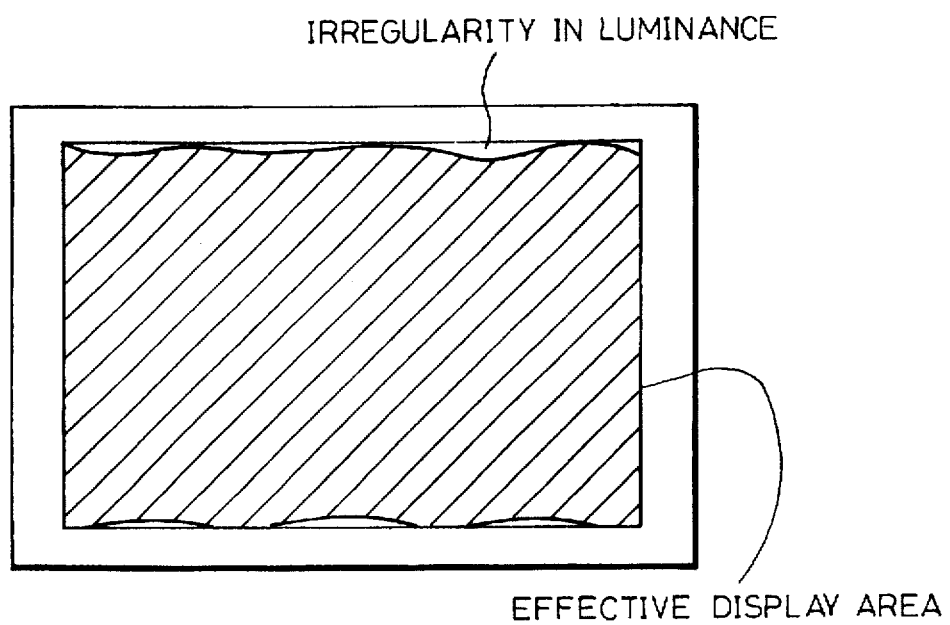
FIG. 26 is an explanatory view showing irregularities in luminance in the vicinity of the effective display area of the STN color liquid crystal display element of FIG. 24.
Figure 27:
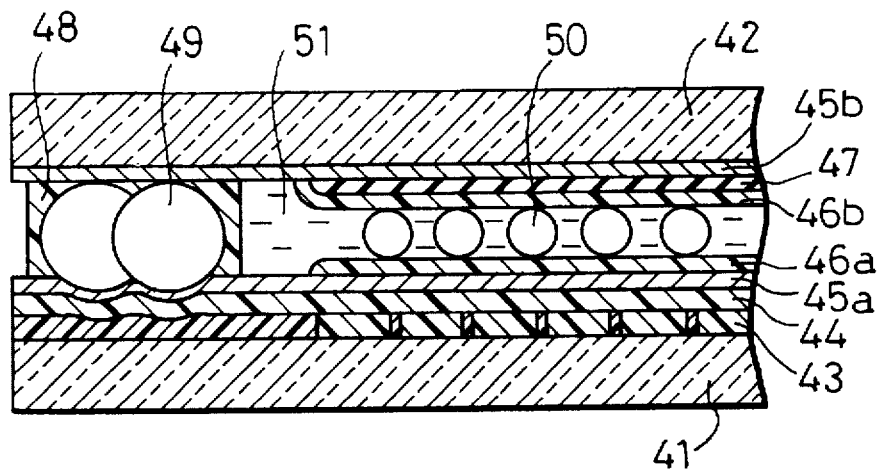
FIG. 27 is a cross-sectional view showing a conventional STN color liquid crystal display element.
Figure 28:
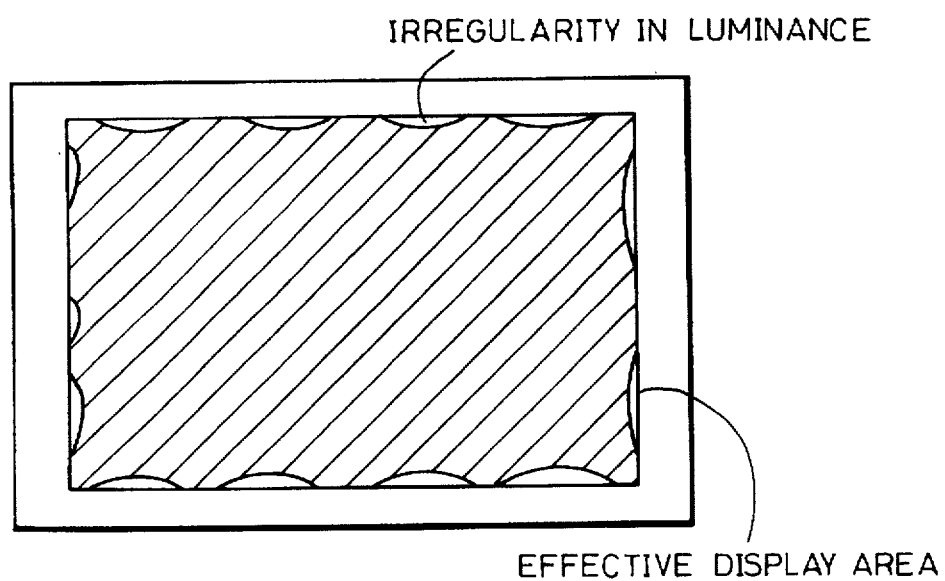
FIG. 28 is an explanatory view showing irregularities in luminance in the vicinity of the effective display area of the conventional STN color liquid crystal display element.
Figure 29:
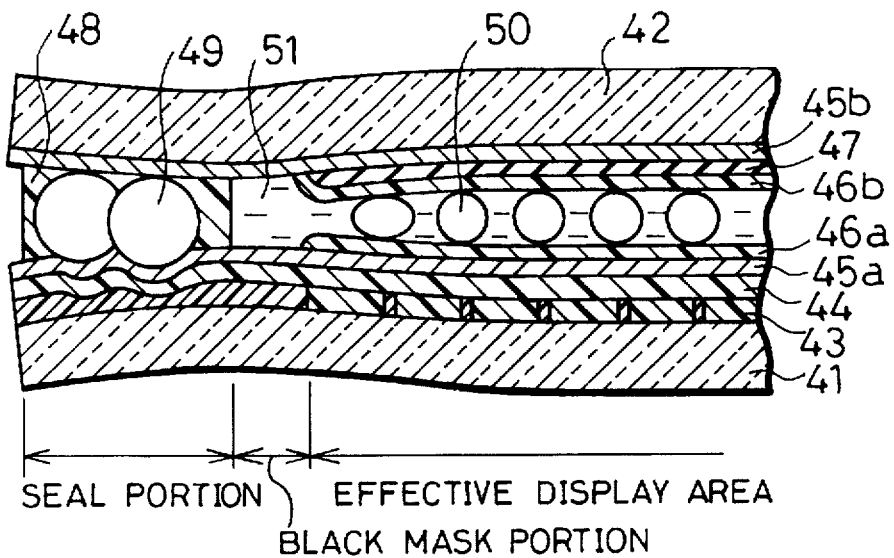
FIG. 29 is a cross-sectional view showing a state of a cell thickness in a range from a seal portion to the vicinity of the effective display area.
Figure 30:
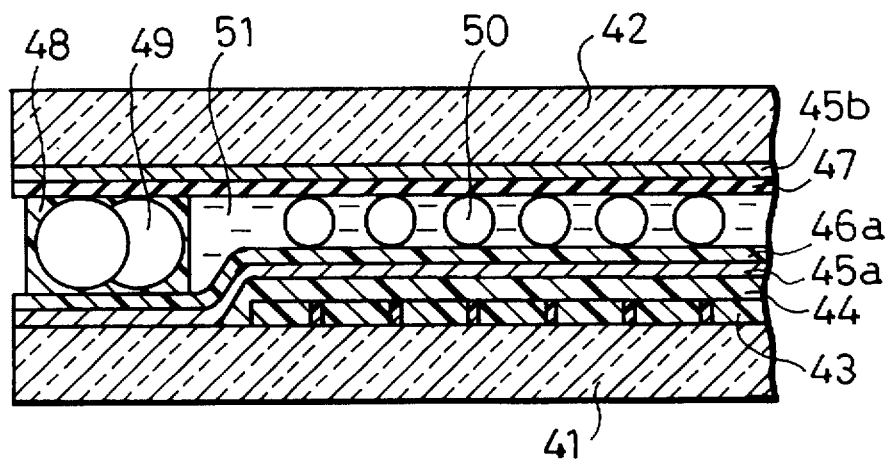
FIG. 30 is a cross-sectional view of another conventional STN color liquid crystal display element.
Figure 31:
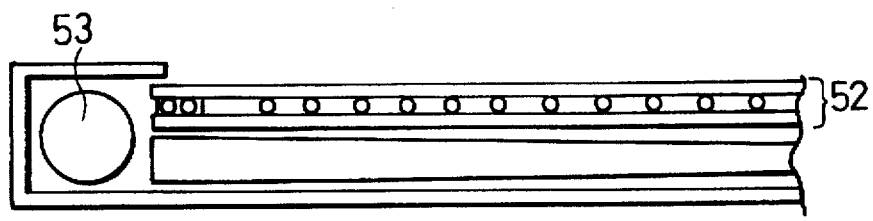
FIG. 31 is a cross-sectional view of a liquid crystal module.
Figure 32:
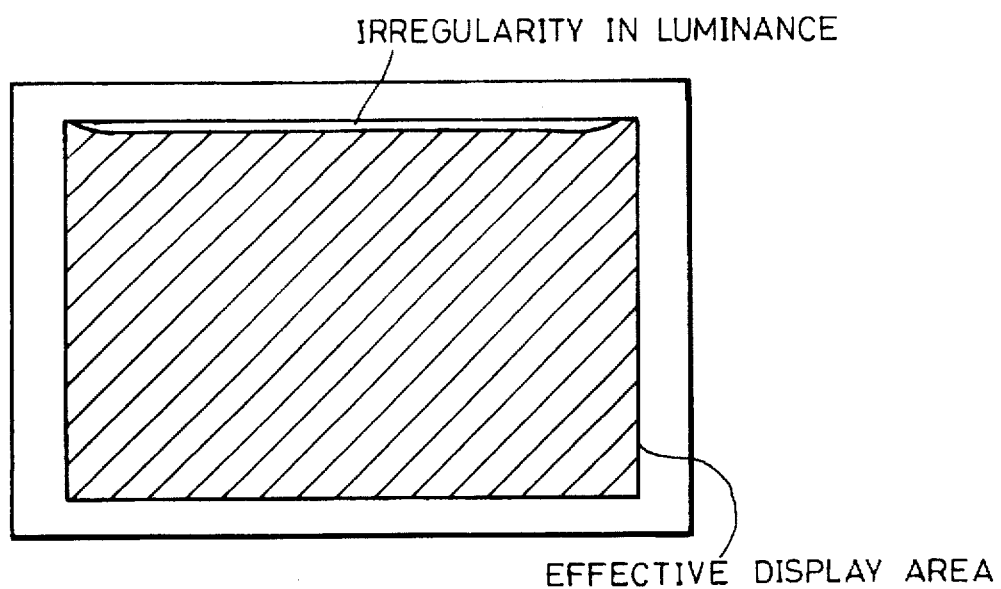
FIG. 32 is an explanatory view showing irregularities in luminance in the vicinity of the effective display area of the STN color liquid crystal display element of FIG. 31.

With respect to the above-mentioned STN color liquid crystal display element, the cell thickness in the vicinity of the effective display area was examined. As a result, as shown in FIG. 25, it was found that it was thinner by 0.03 μm than the cell thickness of areas other than the vicinity of the effective display area. When the STN color liquid crystal display elements were assembled into a liquid crystal module and turned on to display images, irregularities in luminance, as shown in FIG. 26, occurred in the vicinity of the effective display area. Further, when the surface of the overcoat layer 24 of the seal portion was analyzed, an embedment of the glass bead 29 of 0.4 μm was found.

[COMPARATIVE EXAMPLE 4]

A pair of glass substrates 20 and 21 whereon various thin films were formed in the same manner as the STN color liquid crystal display element of the aforementioned embodiment 1 were bonded to each other by using seal material 28 so as to provide an STN color liquid crystal display element. Here, instead of glass beads 29 to be mixed into the seal material 28, plastic spacers having the young's modulus of 400 kgf/mm$^2$ and a particle diameter of 6.3 μm are used and the plastic spacers are mixed at a rate of 10 Wt % to the seal material 28.

With respect to the above-mentioned STN color liquid crystal display element, the cell thickness in the vicinity of the effective display area was examined. As a result, it was found that it was thinner by as much as 0.10 μm than the cell thickness of areas other than the vicinity of the effective display area. This indicates that the use of plastic spacers having an insufficient elastic modulus causes the spacers to deform due to the pressure applied during a bonding process and that the resulting process does not conform to the simulating process that was carried out in the present invention. Moreover, since the specific gravity of plastic spacers is lower than that of glass beads, 10 Wt % of plastic spacers is equivalent to 20 Wt % of glass beads; therefore, it was impossible to increase the rate of the plastic spacers so as to alleviate the applied pressure per plastic spacer, because the increase caused troubles in operability upon mixing the seal material.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display element, which has an effective display area for displaying images and a seal portion located around its periphery, comprising:

a pair of substrates that face each other with a gap in between, each of the substrates having an opposing surface whereon thin films are formed;

a seal material for bonding the substrates to each other, the seal material being placed at a location corresponding to the seal portion of the respective substrates in the gap in such a manner as to surround portions of the respective substrates corresponding to the effective display area; and a liquid crystal layer including liquid crystal that is sealed in the gap, wherein the seal material contains spherical spacers that are made of glass and that are used for maintaining a predetermined gap between the substrates, the spacers being mixed into the seal material at a rate of 7 to 20 Wt % to the seal material.

2. The liquid crystal display element as defined in claim 1, wherein particle diameter R of the spacer is represented by:

$$A+B_T-C_T+(0.1 \ \mu m) \leq R \leq A+B_T-C_T+(0.2 \ \mu m),$$

where A represents the thickness of the liquid crystal layer, $B_T$ represents the total thickness of the thin films located within the effective display area, and $C_T$ represents the total thickness of the thin films located in the seal portion.

3. The liquid crystal display element as defined in claim 1, wherein the liquid crystal layer contains liquid-crystal-layer-use spacers that are used for maintaining a predetermined gap between the substrates and that are kept in contact with the thin films.

4. The liquid crystal display element as defined in claim 1, wherein the thin films include:
- a display-use electrode E1 that is placed on an entire surface of one of the substrates S1;
- an insulating film and an alignment film D1 that are placed on a portion of the display-use electrode E1, the portion being coincident with the effective display area;
- a color filter that is placed on a portion of the other substrate S2, the portion being coincident with the effective display area;
- a black mask that is placed on a portion of the substrate S2, the portion being coincident with the seal portion;
- an overcoat layer that covers the color filter and the black mask;
- a display-use electrode E2 that covers the overcoat layer; and
- an alignment film D2 that is placed on a portion of the display-use electrode E2, the portion being coincident with the effective display area.

5. The liquid crystal display element as defined in claim 4, wherein the black mask is made of a resin.

6. The liquid crystal display element as defined in claim 4, wherein the black mask is made of a metal, and set to be thinner than the color filter.

7. The liquid crystal display element as defined in claim 4, wherein the color filter also covers the black mask.

8. The liquid crystal display element as defined in claim 1, wherein the thin films include:
- a display-use electrode E1 that is placed on an entire surface of one of the substrates S1;
- an insulating film and an alignment film D1 that are placed on a portion of the display-use electrode E1, the portion being coincident with the effective display area;
- a color filter that is placed on a portion of the other substrate S2, the portion being coincident with the effective display area;
- a black mask that is placed on a portion of the substrate S2, the portion being coincident with the seal portion;
- an overcoat layer that covers the color filter;
- a display-use electrode E2 that covers the black mask and the overcoat layer; and
- an alignment film D2 that is placed on a portion of the display-use electrode E2, the portion being coincident with the effective display area.

* * * * *